(12) United States Patent
Andrade et al.

(10) Patent No.: US 11,062,537 B2
(45) Date of Patent: Jul. 13, 2021

(54) FLEET MANAGEMENT FOR VEHICLES USING OPERATION MODES

(71) Applicant: Waymo LLC, Mountain View, CA (US)

(72) Inventors: Ryan Joseph Andrade, Morgan Hill, CA (US); Ryan Cash, Sunnyvale, CA (US); Peter Colijn, San Francisco, CA (US); Laurens Andreas Feenstra, San Francisco, CA (US); Congyu Gao, Palo Alto, CA (US); Dirk Haehnel, Sunnyvale, CA (US); Steven Reis, San Jose, CA (US); Omari Stephens, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 403 days.

(21) Appl. No.: 15/908,113

(22) Filed: Feb. 28, 2018

(65) Prior Publication Data

US 2019/0266815 A1 Aug. 29, 2019

(51) Int. Cl.
*G07C 5/08* (2006.01)
*G05D 1/02* (2020.01)
(Continued)

(52) U.S. Cl.
CPC ......... *G07C 5/0841* (2013.01); *B60W 30/182* (2013.01); *B60W 40/02* (2013.01); *G05D 1/0088* (2013.01); *G05D 1/0291* (2013.01); *G06Q 10/06* (2013.01); *G06Q 10/08* (2013.01); *G07C 5/008* (2013.01); *G05D 2201/0213* (2013.01)

(58) Field of Classification Search
None
See application file for complete search history.

(56) References Cited

U.S. PATENT DOCUMENTS 9,280,902 B2  3/2016  Silzer, Sr. et al.
9,368,026 B1  6/2016  Herbach et al.
(Continued)

FOREIGN PATENT DOCUMENTS

CN  103 200 268 B   1/2016
CN  106774246 A    5/2017
(Continued)

OTHER PUBLICATIONS

International Search Report and Written Opinion for application No. PCT/US2019/019538 dated Apr. 11, 2019.

*Primary Examiner* — Kelly D Williams
(74) *Attorney, Agent, or Firm* — Botos Churchill IP Law

(57) ABSTRACT

Aspects of the disclosure relate to determining vehicle operation modes for a fleet of vehicles. This may include maintaining a storage system including vehicle parameters for a vehicle fleet such that each vehicle of the fleet is associated with a set of vehicle parameters. The vehicle operation mode may be determined by selecting one of a plurality of vehicle operation levels arranged in a hierarchy or by identifying a set of tags where each level or tag corresponds to a vehicle driving capability. The determined vehicle operation mode may be communicated to the given vehicle in order to cause the vehicle to operate according to the determined vehicle operation mode.

20 Claims, 10 Drawing Sheets

TABLE 1

| HOL | Vehicle Operation Mode | Description |
|---|---|---|
| 0 | Non-functional | Should not be allowed to drive anywhere, autonomously or manually. |
| 1 | Closed course manual | Should not be allowed on public roadways or driven autonomously in a closed course, but may be driven manually on a closed course. |
| 2 | Closed course autonomous | Should not be allowed on public roadways, but may be driven manually or autonomously on a closed course. |
| 3 | Public roads manual | May be driven on public roadways manually, and may only be driven autonomously on a closed course. |
| 4 | Public roads manual (data labeling) | May be driven on public roadways manually with sensors functioning to collect data, and may only be driven autonomously on a closed course. |
| 5 | Public roads autonomous with test driver | May be driven on public roadways manually or autonomously so long as a test driver (human operation) is present in the vehicle (in order to be able to take control of the vehicle if needed). |
| 6 | Public roads autonomous | May be driven on public roadways manually or autonomously |
| 7 | Public roads autonomous with passengers (non-production use) | May be driven on public roadways manually or autonomously with passengers (no charging) |
| 8 | Public roads autonomous with passengers (production use) | May be driven on public roadways manually or autonomously with passengers (with charging) |

(51) Int. Cl.
 *G05D 1/00* (2006.01)
 *B60W 30/182* (2020.01)
 *B60W 40/02* (2006.01)
 *G07C 5/00* (2006.01)
 *G06Q 10/08* (2012.01)
 *G06Q 10/06* (2012.01)

(56) References Cited

U.S. PATENT DOCUMENTS

| | | |
|---|---|---|
| 9,606,539 B1 | 3/2017 | Kentley et al. |
| 9,805,519 B2 | 10/2017 | Ramanujam |
| 2008/0140278 A1 | 6/2008 | Breed |
| 2011/0231055 A1 | 9/2011 | Knight et al. |
| 2012/0303178 A1 | 11/2012 | Hendry et al. |
| 2015/0178998 A1 | 6/2015 | Attard |
| 2017/0123784 A1 | 5/2017 | Zymeri |
| 2017/0124781 A1 | 5/2017 | Douillard |
| 2019/0186947 A1* | 6/2019 | Rockmore ............. B60K 37/00 |

FOREIGN PATENT DOCUMENTS

| | | |
|---|---|---|
| DE | 10 2012 002758 A1 | 8/2013 |
| DE | 102013015737 A1 | 4/2014 |
| DE | 10 2013 223124 A1 | 5/2015 |
| DE | 10 2014 016532 A1 | 5/2016 |
| EP | 2192015 A1 | 6/2010 |
| WO | 2013096716 A1 | 6/2013 |
| WO | 2017079321 A1 | 5/2017 |

\* cited by examiner

TABLE 1

| HOL | Vehicle Operation Mode | Description |
|---|---|---|
| 0 | Non-functional | Should not be allowed to drive anywhere, autonomously or manually. |
| 1 | Closed course manual | Should not be allowed on public roadways or driven autonomously in a closed course, but may be driven manually on a closed course. |
| 2 | Closed course autonomous | Should not be allowed on public roadways, but may be driven manually or autonomously on a closed course. |
| 3 | Public roads manual | May be driven on public roadways manually, and may only be driven autonomously on a closed course. |
| 4 | Public roads manual (data labeling) | May be driven on public roadways manually with sensors functioning to collect data, and may only be driven autonomously on a closed course. |
| 5 | Public roads autonomous with test driver | May be driven on public roadways manually or autonomously so long as a test driver (human operation) is present in the vehicle (in order to be able to take control of the vehicle if needed). |
| 6 | Public roads autonomous | May be driven on public roadways manually or autonomously |
| 7 | Public roads autonomous with passengers (non-production use) | May be driven on public roadways manually or autonomously with passengers (no charging) |
| 8 | Public roads autonomous with passengers (production use) | May be driven on public roadways manually or autonomously with passengers (with charging) |

FIGURE 2A

TABLE 2

| Tag ID | Description |
|---|---|
| T01 | Manual mode capability |
| T02 | Autonomous mode capability |
| T03 | No test driver required for autonomous mode |
| T04 | Autonomous mode with passengers |
| T05 | Autonomous mode in rain |
| T06 | Autonomous mode in snow |
| T07 | Autonomous mode in sleet |
| T08 | Autonomous mode above 98 degrees |
| T09 | Autonomous mode below 32 degrees |
| T10 | Autonomous mode icy |
| T11 | Autonomous mode wet |

FIGURE 2B

FLEET MANAGEMENT FOR VEHICLES USING OPERATION MODES

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Thus, such vehicles may be used to provide transportation services.

Other systems which provide transportation services typically include drivers or conductors who are tasked with making decisions about how to operate vehicles. Such services may include some backend server systems which can dispatch vehicles to certain locations to provide transportations services as well as provide fleet management and vehicle staging instructions.

BRIEF SUMMARY

One aspect of the disclosure provides a method. The method includes maintaining a storage system including vehicle parameters for a vehicle fleet such that each vehicle of the fleet is associated with a set of vehicle parameters; determining a vehicle operation mode for a given vehicle of the vehicle fleet by selecting one of a plurality of vehicle operation levels arranged in a hierarchy, each of the plurality of vehicle operation levels being (1) associated with a set of requirements and (2) identifying a vehicle driving capability, and wherein the selecting includes comparing the set of vehicle parameters associated with the given vehicle in the storage system with one or more of the sets of requirements according to an order of the hierarchy; and communicating the determined vehicle operation mode to the given vehicle in order to cause the vehicle to operate according to the determined vehicle operation mode.

In one example, the storage system comprises a plurality of values for each vehicle in the vehicle fleet, the values including part numbers for a set of vehicle parts installed on the vehicle. In another example, the storage system comprises a plurality of values for each vehicle in the vehicle fleet, the values including calibration information for vehicle sensors. In another example, the storage system comprises a plurality of values for each vehicle in the vehicle fleet, the values including software versions being run on each vehicle. In another example, the method also includes further comprising receiving data from a respective vehicle of the fleet and responsively updating the storage system. In this example, the method also includes, in response to receiving data from the respective vehicle, determining a revised vehicle operation mode and communicating the revised vehicle operation mode to the respective vehicle. In another example, the method also includes receiving revised vehicle operation level criteria, responsively determining a revised vehicle operation mode for the vehicle using the revised vehicle operation level criteria, and communicating the revised vehicle operation mode to the vehicle in order to cause the vehicle to operate according to the revised vehicle operation mode. In another example, the plurality of vehicle operation levels includes a level including an autonomous driving mode. In this example, the plurality of vehicle operation levels includes a level including a manual driving mode. In another example, the method also includes determining and communicating the vehicle operation mode are performed periodically for the given vehicle.

Another aspect of the disclosure provides a method. The method includes maintaining a storage system including vehicle parameters for a vehicle fleet such that each vehicle of the fleet is associated with a set of vehicle parameters and determining a vehicle operation mode for a given vehicle of the vehicle fleet by: identifying a set of tags based on a first subset of the vehicle parameters for the given vehicle in the storage system, each tag of the set corresponding to a possible driving capability of the given vehicle, filtering the set of tags based on a second subset of vehicle parameters for the given vehicle, wherein the second subset includes at least one vehicle parameter not included in the first subset, and using the filtered set of tags to identify the vehicle operation mode for the given vehicle. The method also includes communicating the determined vehicle operation mode to the given vehicle in order to cause the vehicle to operate according to the determined vehicle operation mode.

In one example, the set of tags includes a tag identifying that the given vehicle is capable of driving in an autonomous driving mode. In another example, the set of tags includes a tag identifying that the given vehicle is capable of driving in an autonomous driving mode without a test driver. In another example, the set of tags includes a tag identifying that the given vehicle is capable of driving in an autonomous driving mode and transporting passengers. In another example, the set of tags includes a tag identifying that the given vehicle is capable of driving in a given type of weather condition. In this example, the given type of weather condition includes rain. In another example, the set of tags includes a tag identifying that the given vehicle is capable of driving in a given type of road surface condition. In this example, the given type of road surface condition includes a degree of slipperiness of a roadway. In another example, the set of tags includes a tag identifying that the given vehicle is capable of driving in external environments having a predetermined temperature. In another example, filtering the set of tags is further based on whether the storage system includes a work order for the given vehicle identifying an operation mode requirement for the given vehicle.

BRIEF DESCRIPTION OF THE DRAWINGS

FIG. 2A is an example table of hierarchical operations levels and corresponding operation modes in accordance with aspects of the disclosure.

FIG. 2B is an example table tags in accordance with aspects of the disclosure.

DETAILED DESCRIPTION

Overview

Figure 1:
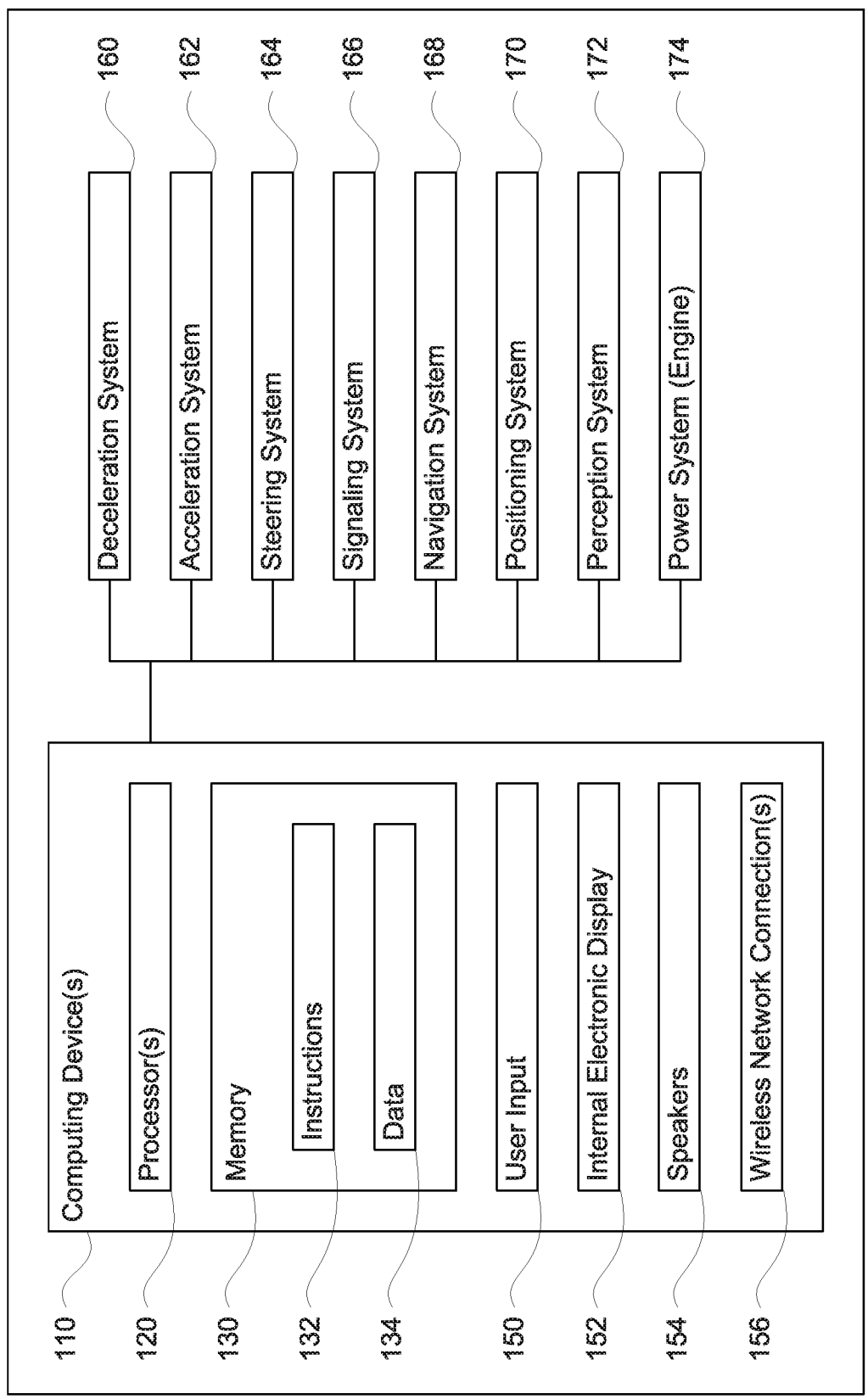
FIG. 1 is a functional diagram of an example vehicle in accordance with an exemplary embodiment.

The technology relates to systems for automatically managing the operation modes of a fleet of autonomous vehicles, which may provide transportation services for moving passengers or cargo. While typical systems may include manual and some automated tracking of vehicle functionality and safety, for instance for safety recalls, there can be quite significant delays between when a recall is initiated and when a vehicle is taken off the road or fixed. Moreover, when managing a fleet of vehicles, processing this information manually (even with the assistance of computing devices) can quickly become an arduous task which is ripe for human error. These issues are compounded when the vehicles themselves are being operated in an autonomous mode, and any problems may not manifest themselves in a way which the vehicle's computing devices or a person within the vehicle can react to immediately. This can create serious safety concerns for the passengers of those vehicles as well as other persons, vehicles, drivers, etc.

To address these issues, a system may control the operation of vehicle by using operations modes and corresponding requirements. An operations mode may define a type of operation of a vehicle having self-driving capabilities. For instance, one or more server computing devices may maintain a table, database, or other storage configuration which identifies each of the possible operation mode and corresponding vehicle requirements for that mode. In one example, each operations mode may be arranged with other operations modes in a hierarchy of operations levels such that higher operations levels have more requirements. In this example, each operation mode and corresponding hierarchical operations level may be associated with requirements which define whether a vehicle can be driving according to the type of operation for that hierarchical operations level. Because the hierarchical operations levels are arranged in a hierarchy, a given hierarchical operation level may include all of the requirements of any operations level below the given level.

Alternatively, rather than being arranged as a hierarchy of levels, each operations mode may be associated with a combination of badges, markers or tags representing capabilities of a vehicle. Each combination of tags may define an operation mode for a vehicle. As with the hierarchical example, each tag may be associated with a set of requirements.

In addition to the operation modes (hierarchical and tag-based) discussed above, the server computing devices may maintain a table, database, or other storage configuration of vehicle parameters or capabilities. This storage may also include any open work orders for the vehicles. Work orders may identify the maintenance or other "needs" of the vehicle. At least some work orders may include a field which defines a particular operations mode requirement or blocks the vehicle from being able to use a particular operations mode. In this regard, a work order can be used to fix or limit a vehicle to a lower operations mode or prevent certain tags, even if that vehicle would otherwise be properly configured for a higher operations level or particular tag.

In order to determine the operations mode for each vehicle, the system must continuously maintain and update the database of vehicle parameters. For instance, each vehicle of the fleet may periodically send updates to the system identifying the various vehicle parameters. These may be updated in the database accordingly.

At least some of the parameters may not directly come from the vehicles themselves, but from updates provided manually by operators. Similarly, the server computing devices 410 may generate or receive and store the work orders described above.

The server computing devices may determine a vehicle operation mode for each vehicle of the vehicle fleet using the most up to date vehicle parameters. For instance, referring to the hierarchical operations levels example, the server computing devices may use the vehicle parameters for a given vehicle to determine whether the vehicle meets the requirements of each operations level starting with the lowest operations level. The server computing devices may identify a highest operations level for which the vehicle parameters of the given vehicle meet the requirements as the operations mode for the given vehicle Returning to the tag example, the server computing devices may determine a vehicle operation mode for a given vehicle, such as vehicle, by first generating an initial set of tags for the given vehicle. Thereafter, those tags are filtered in order to determine a final set of tags for vehicle. The resulting filtered set of tags may be used to determine an operation mode for the vehicle.

Each time an operation mode determination is made for a given vehicle, the server computing devices 410 may communicate the determined operations level to the given vehicle. In response, the computing devices of the given vehicle may continue to operate at the current operations mode if the same as the new operations mode, or may begin to operation at a different operations mode if the new operations mode is different from the current operations mode.

The features described herein allow for increased vehicle safety by preventing vehicles from driving in operation modes for which those vehicles do not have the capabilities. By having the work order features discussed above, a human operator may quickly change, or really reduce, the operations level of a specific vehicle without affecting other vehicles of the fleet. In addition, by storing vehicle capabilities in one place, this allows the system to be updated and respond to changes to the vehicle parameters quickly and efficiently while at the same time reducing concerns over human error. Moreover, this information may allow the system to determine the number and types of vehicles of the fleet that are available for different tasks. Based on (expected) task needs, operators may determine that more vehicles of a certain hierarchical operations level or operation mode are needed. The reports discussed herein can therefore be used to help allocate resources to increasing the operations levels of vehicles as efficiently as possible.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may be capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
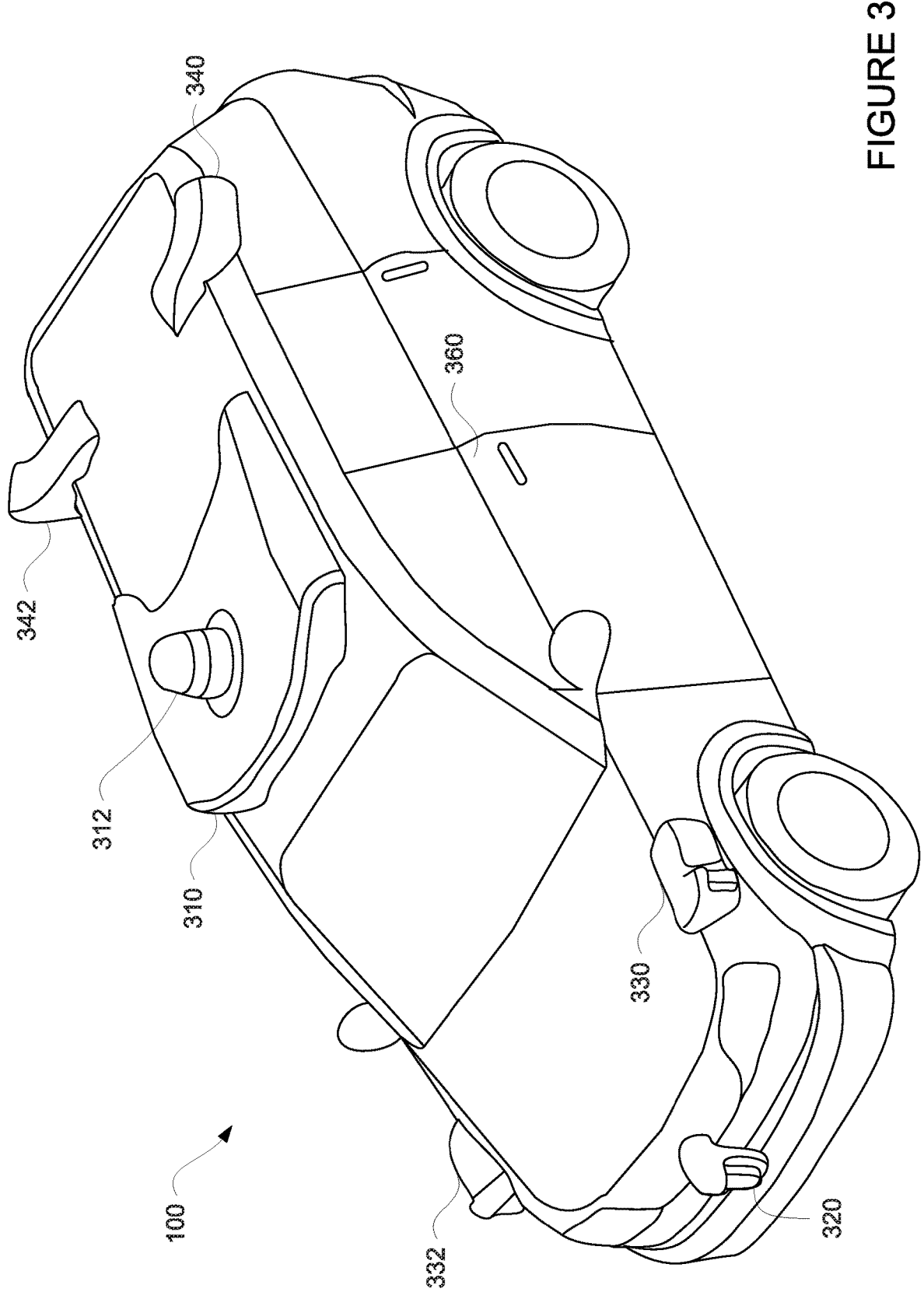
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing devices 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may control the direction and speed of the vehicle according to various operation modes which include autonomous driving by controlling various components. By way of example, computing devices 110 may navigate the vehicle to a destination location completely autonomously using data from the detailed map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

The vehicle 100 may be able to operate according to one or more vehicle operation modes. The different modes may identify a level of autonomy for the autonomous vehicles, or rather, whether the vehicle is able to operate in a manual mode, whether the vehicle is able to operate in an autonomous mode and/or whether that autonomous mode has certain restrictions. For instance, turning to Table 1 of FIG. 2A, an example of different operation modes may include a non-functional mode, where the vehicle is not able to drive in an autonomous mode or a manual mode, all the way to a public roads autonomous mode with paying passengers. For instance, in response to receiving instructions from a remote server computing device, such as server computing devices 410 discussed further below, identifying an operation mode, the computing devices 110 may cause the vehicle to operate according to that identified operation mode. As an example, if the identified operation mode is a manual only mode, the computing devices 110 may prevent the vehicle from being operated in an autonomous driving mode by refusing to start modules required for autonomous driving and/or not sending or otherwise preventing signals from the computing devices 110 that would otherwise control the acceleration system 162, deceleration system 160, or steering system 164. In addition, the computing devices 110 could communicate this information to the server computing devices 410 and/or any human operators using a work station, such as work station 440 discussed further below, to allow for confirmation that the vehicles of the fleet are responding as needed to the instructions from the server computing devices.

Figure 4:
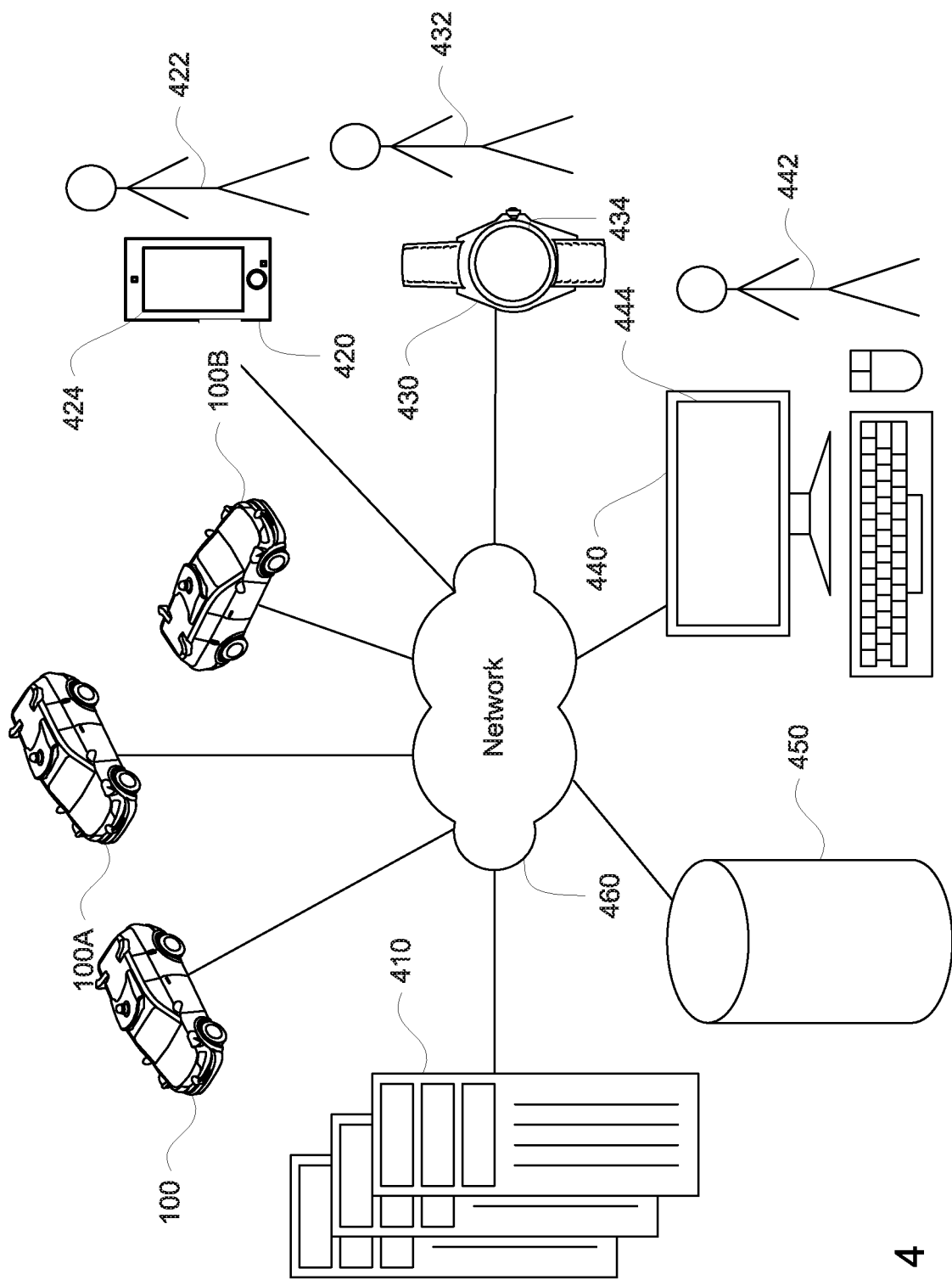
FIG. 4 is a pictorial diagram of an example system in accordance with an exemplary embodiment.
Figure 5:
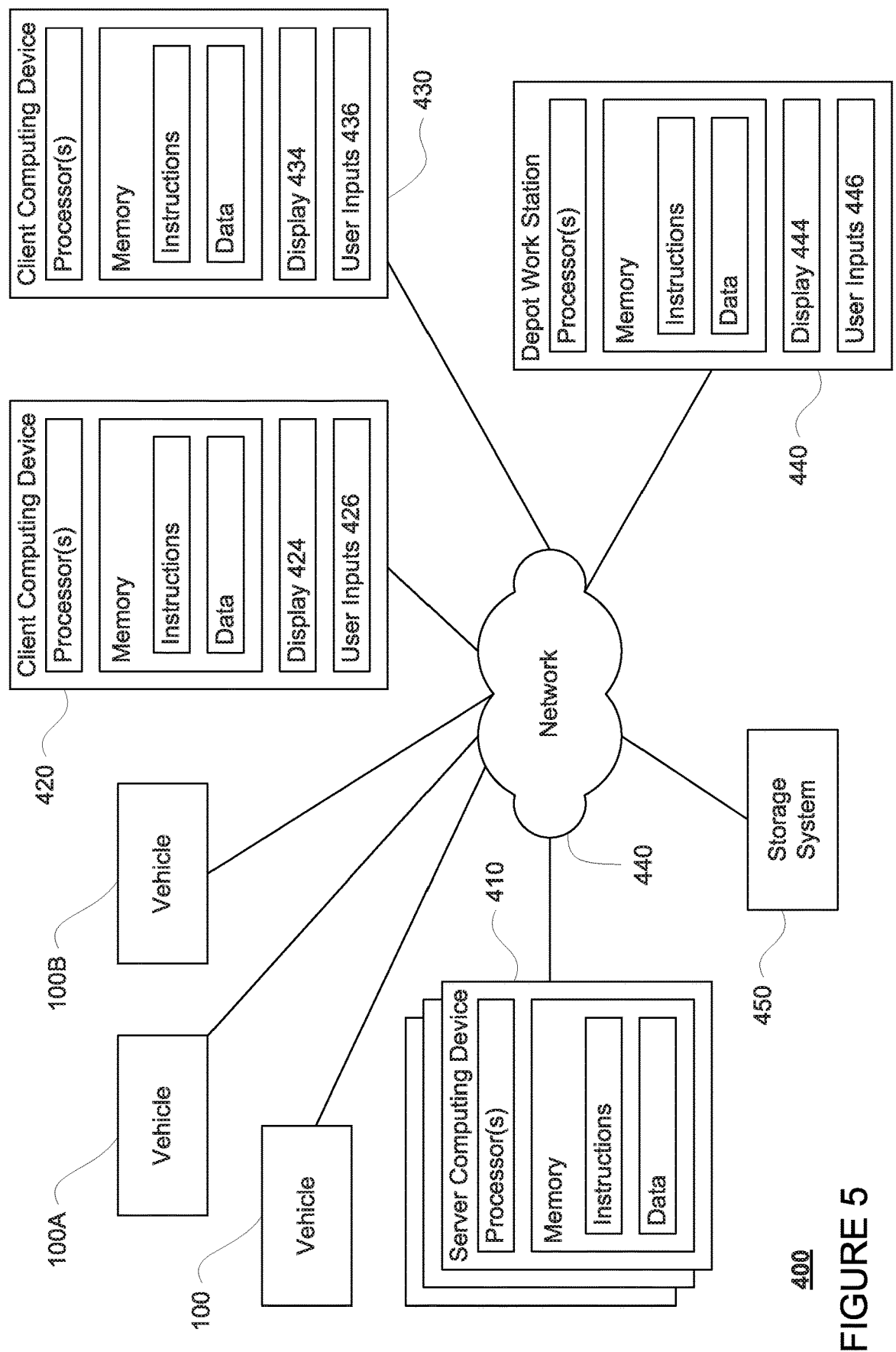
FIG. 5 is a functional diagram of the system of FIG. 4 in accordance with aspects of the disclosure.

In this regard, computing devices 110 of vehicle 100 may also send and receive information to and from other computing devices, such as those computing devices that are a part of the transportation service as well as other computing devices. As an example, the computing devices 110 may send status updates and receive information identifying a determined operation mode. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing devices 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing devices 110 of vehicle 100 or a similar computing device of vehicle 100A, 100B as well as computing devices 420, 430, 440 via the network 460. For example, vehicles 100, 100A, 100B may be a part of a fleet of vehicles, the operation modes of which may be determined and controlled by server computing devices. In this regard, the server computing devices 410 may function as an operation mode control system. In addition, the vehicles of the fleet may periodically send the server computing devices information relating to the status of the vehicles discussed further below, and the one or more server computing devices may use to update or change the information of the storage system 450.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be a work station used by an administrator or operator to update or change certain information for the vehicles of the fleet. For example, user 442 may be a human operator who uses the work station 440 to enter "work orders" or information updates, as discussed further below, and/or perform various maintenance services and communication operations for the vehicle of the fleet. Although only a single work station 440 is shown in FIGS. 4 and 5, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. As an example, each operations mode may be arranged with other operations modes in a hierarchy of operations levels such that higher operations levels have more requirements. For instance, as shown in Table 1 of FIG. 2A, each operation mode is associated with a corresponding hierarchical operations levels (HOL). Of course, some levels and/or operation modes may be removed or changed and others included based on the functionality of the fleet of vehicles.

As noted above, each operation mode and corresponding hierarchical operations level may be associated with requirements which define whether a vehicle can be driving according to the type of operation for that hierarchical operations level. For instance, each hierarchical operations level may include a set of hardware or vehicle part requirements, software requirements, hour and/or mileage requirements, instruction sticker requirements, and basic information requirements. As an example, the hardware and software requirements may specify specific hardware, such as sensors, vehicle configurations (i.e. all wheel drive, four wheel drive, or rear wheel drive, the number of passenger seats, etc.), tire types, etc. or software versions required for a particular hierarchical operations level. Alternatively, the hardware and software requirements may identify whitelisted or blacklisted part numbers. The hour and/or mileage requirements may relate to how long it has been since the vehicle last had its sensors calibrated or how long has operated with a particular sensor. The basic information requirements may relate to vehicle identifiers (i.e. system identifiers or "VIN"), vehicle registrations, permits, insurance, or other legal requirements for vehicles on public roadways. These requirements may be adjusted periodically whenever new hardware or software versions become available, etc.

Because the hierarchical operations levels are arranged in a hierarchy, a given hierarchical operation level may include all of the requirements of any operations level below the given level. For instance, Level 8 or "Public roads autonomous with passengers (production use)" may require all of the requirements of Levels 0 through 7, but with at least one additional requirement from Level 7 "Public roads autonomous with passengers (non-production use)", such as requiring sensors to meet certain standards, etc. Similarly, Level 6 or "Public roads autonomous" may include all of the requirements of each of Levels 0 through 5.

Alternatively, rather than being arranged as a hierarchy of levels, each operations mode may be associated with a combination of badges, markers or tags representing capabilities of a vehicle. Referring to Table 2 of FIG. 2B, example tags may include whether the vehicle is capable of being in a manual driving mode (Tag ID T01), whether the vehicle is capable of driving in an autonomous driving mode (Tag ID T02), whether the vehicle is capable to drive in an autonomous driving mode without a test or other driver (Tag ID T03), whether the vehicle is capable to drive in an autonomous driving mode and transport passengers (Tag ID T04), whether the vehicle is capable of driving in a given weather condition (such as rain, snow, sleet, high temperatures such as above 98 degrees or more or less, low temperatures, or other inclement weather) (Tag IDs T05-09), whether the vehicle is able to drive in a given type of road surface condition (such as icy, wet, or conditions relating to a degree of slipperiness) (Tag IDs T10-11). Of course, some tags may be removed or changed and others included based on the functionality of the fleet of vehicles. In some instances, the tags may even be used to facilitate geofencing, by limiting or restricting vehicles to staying within our out of certain areas.

As noted above, each combination of tags may define an operation mode for a vehicle. In one example, one combination of tags, such as T01; T02, may allow a vehicle to operate only in dry conditions, with a test driver, and in the autonomous mode. Another combination of tags, such as T01; T02; T03; T04; T05; T06; T07; T08; T09; T10; T11, may allow a vehicle to operate in all weather conditions, without a test driver, and in the autonomous driving mode.

As with the hierarchical example, each tag may be associated with a set of requirements. For instance, as with the hierarchical operations levels, each tag may include a set of hardware or vehicle part requirements, software requirements, hour and/or mileage requirements, instruction sticker requirements, and basic information requirements. In this regard, each operation mode may correspond to a combination of predetermined tags each having an associated set of requirements. As in the hierarchical operations level example, requirements may be adjusted periodically whenever new hardware or software versions become available, etc.

In addition to the operation modes (hierarchical and tag-based) discussed above, the storage system 450 may maintain a table, database, or other storage configuration of vehicle parameters or capabilities. In other words, for each vehicle of the fleet, a database may store a set of vehicle parameters identifying hardware and software types and versions, specific part numbers, hour and/or mileage information (for specific sensors, etc.), whether there is currently a driver or test driver in the vehicle, as well as the basic information for that vehicle. For instance, this information may include what revision of sensors are on a vehicle, what software versions (for sensors or other vehicle processors) are being run by the vehicle, what tests the vehicle has passed and when, (e.g., are the sensors well-calibrated within certain thresholds), and whether the car has the right permits and approvals (e.g., does it have a registered license plate that hasn't expired), etc.

The storage system 450 may also include any open work orders for the vehicles. Work orders may identify the maintenance or other "needs" of the vehicle, such as refueling, oil change, tire rotation, sensor inspection or calibration, etc. At least some work orders may include a field which defines a particular operations mode or blocks the vehicle from being able to use a particular operations mode. In this regard, a work order can be used to fix or limit a vehicle to a lower operations mode or prevent certain tags, even if that vehicle would otherwise be properly configured for a higher operations level or particular tag. As such, some work orders may be "blocking" that is, such work orders may prevent the vehicle from entering a particular operations mode, while other work orders may be "non-blocking" which would not affect the operations mode for that vehicle.

Work orders can be specific to specific vehicles or groups of vehicles. For instance, if a firmware update is required for safe operation in Level 6 or higher, an operator may enter a blocking work order on all vehicles preventing Level 6 or higher until the firmware update is completed. This may put all vehicles in the fleet into Level 5 or lower. As individual vehicles receive the firmware update, the work orders may be deleted or closed out, allowing those vehicles to enter Level 6 or higher (assuming all other requirements for those levels are met). Similarly, if a particular hardware type is required for a particular tag, such as a certain sensor being required for autonomous operation at temperatures greater than 98 degrees, an operator may enter a blocking work order on all vehicles preventing operational modes including the particular tag until the sensor is included on those vehicles. This may prevent all vehicles from operating autonomously in temperatures greater than 98 degrees. As another example, if a particular feature is required for certain driving environments, this may be controlled via a blocking work order. For instance, if a heavier weight oil for operation in high temperatures, a blocking work order could be used to ensure that vehicles of the fleet do not operate in high temperatures without having the appropriate oil weight. In another instance, a blocking work order could be used to ensure that vehicles of the fleet have a predetermined minimum tire tread depth before being able to operate operate in snow or sleet. Where an operator can enter a blocking work order manually, for instance by using work station 440, this may allow the operator to easily override the operations mode for a particular vehicle without requiring changes to the requirements of the operations modes which would affect other vehicles.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In order to determine the operations mode for each vehicle, the system must continuously maintain and update the database of vehicle parameters. For instance, each vehicle of the fleet may periodically send updates to the system identifying the various vehicle parameters. These may be updated in the database accordingly.

As noted above, the vehicles of the fleet drive around, they may constantly report to the server computing devices 410 their status identifying the vehicle's current parameters and/or any changes to such parameters since the last update was provided. As noted above, the server computing devices 410 may receive the status reports and track the status of each vehicle in storage system 450.

Figure 6:
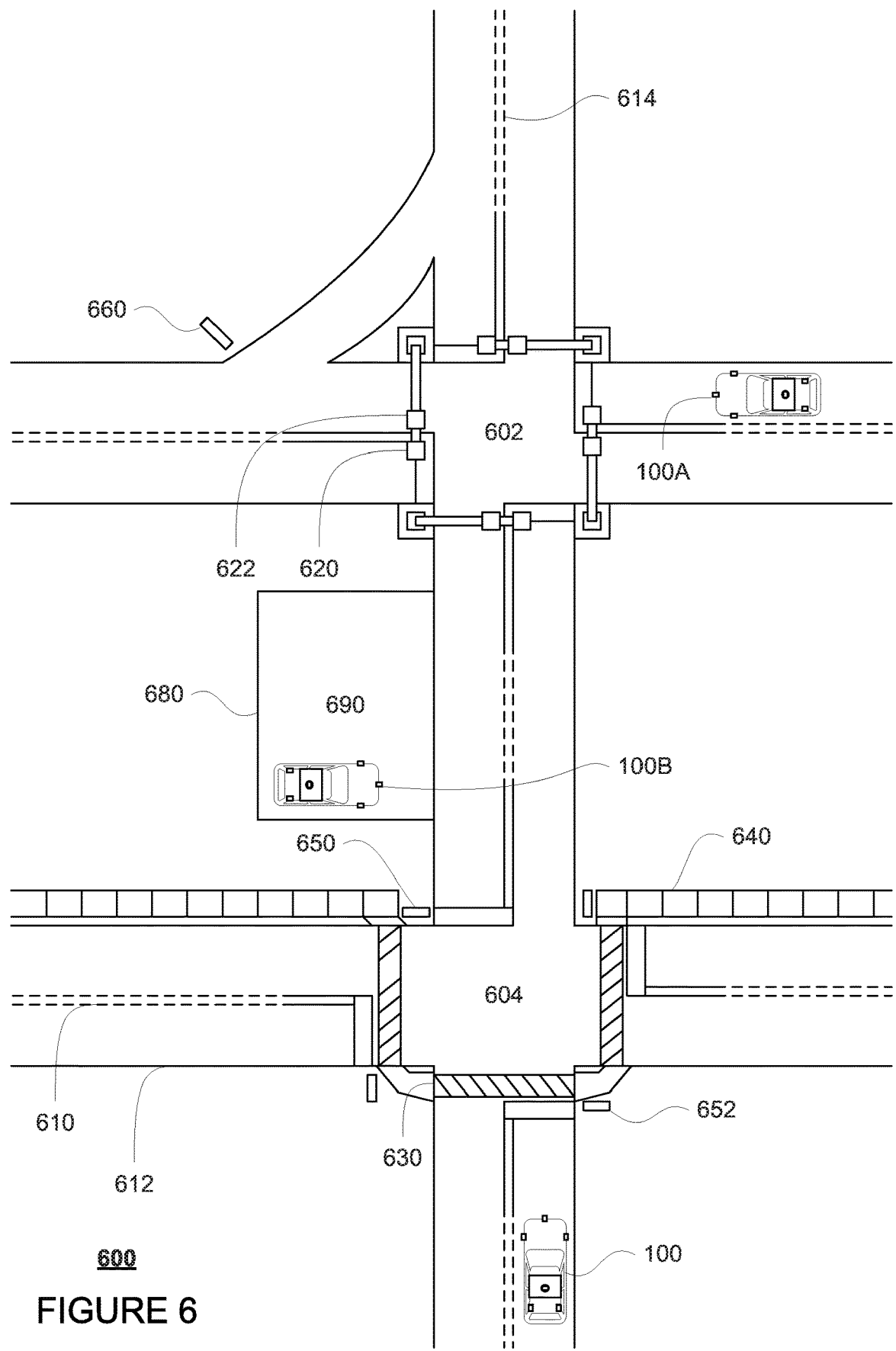
FIG. 6 is an example bird's eye view of a section of roadway in accordance with aspects of the disclosure.

FIG. 6 depicts vehicles 100 and 100A being maneuvered on a section of roadway 600 including intersections 602 and 604, lane lines 610, 612, and 614, traffic signals 620, 622, 624, crosswalk 630, sidewalks 640, stop signs 650, 652, yield sign 660, and various other features. Vehicle 100B is parked in a parking area 690 of a service station 680. The service station 680 may allow human operators to maintain, refuel, update, and otherwise service the vehicles of the fleet.

Again, each vehicle may periodically or constantly provide status updates to the server computing devices 410 using network 460. Each vehicle's positioning system 170 may provide the vehicle's computing devices 110 with the vehicle's location, position as well as information from the vehicle's perception system 172 regarding the operational status of the vehicle's various sensors. The computing devices 110 may also receive, monitor or otherwise maintain information such as error messages identifying hardware failures, software failures, non-responsive systems, as well as other parameters such as how long (in hours or miles) it has been since the vehicle last had its sensors calibrated, how long has operated with a particular sensor, etc. The computing devices 110 may then send this information to the server computing devices 410.

Figure 7:
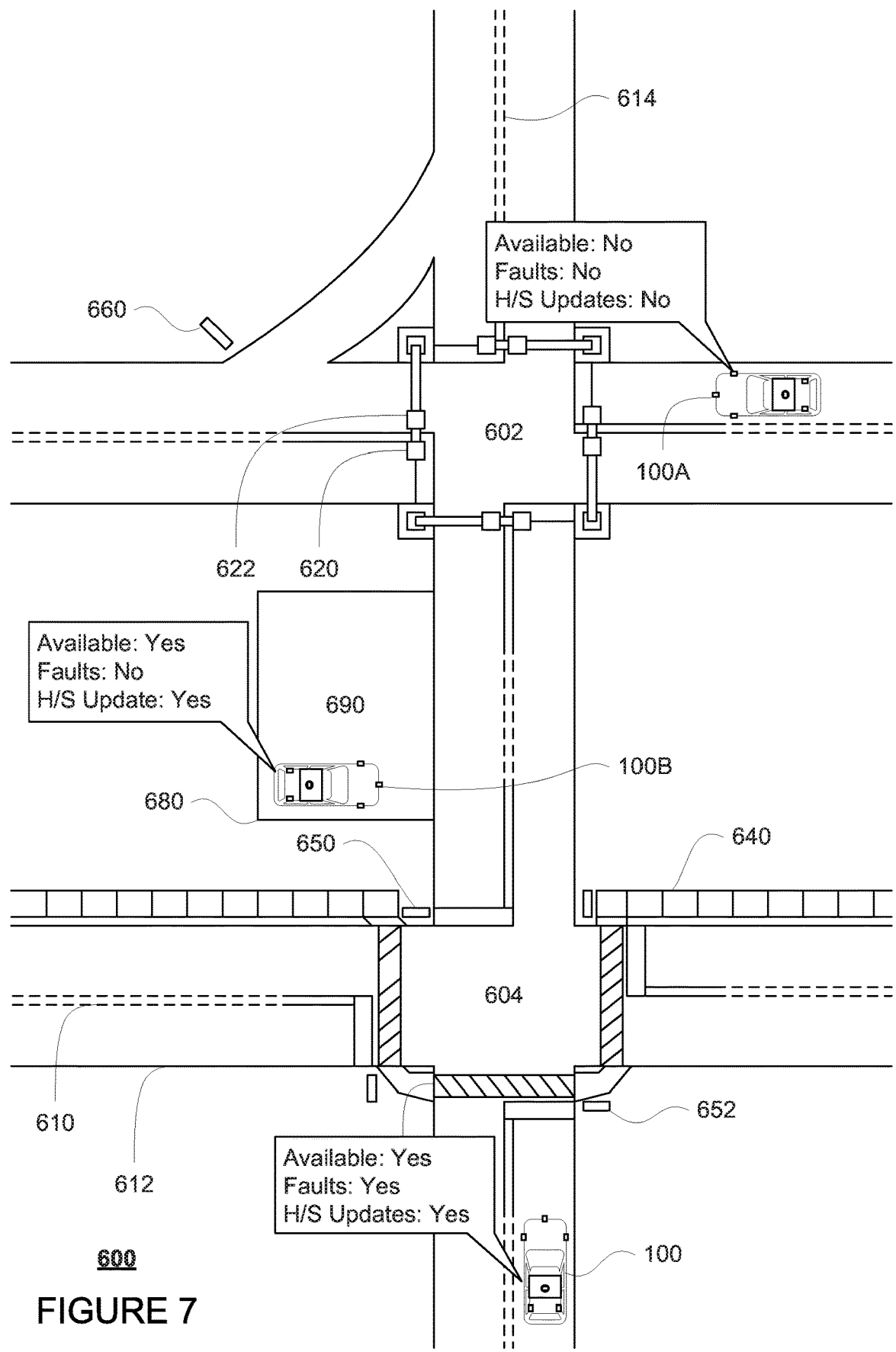
FIG. 7 is an example bird's eye view of a section of roadway and status updates in accordance with aspects of the disclosure.

FIG. 7 depicts an example of the information received and tracked by the server computing devices 410. For instance, each of vehicles 100, 100A, and 100B may report that its location as well as other status information including, for instance current vehicle parameters. In this example, vehicle 100 is reporting a software update was recently installed (for instance via network 460), a system fault at one of its sensors, and does not include any passengers. Vehicle 100A is reporting that it is currently occupied or providing transportation services to passengers, no faults, and no hardware or software updates. Vehicle 100B is reporting that it has received a hardware upgrade (for instance, a new sensor for the vehicle's perception system), no faults, and that it is now available to provide transportation services. The server computing devices 410 may then use this information to update the respective vehicle parameters of vehicles 100, 100A, and 100B in storage system 450.

At least some of the parameters may not directly come from the vehicles themselves, but from updates provided manually by operators, such as the basic information or when new stickers (i.e. "press here to unlock", "camera is on", etc.) are added to the vehicle. As another example, when new hardware is installed, the part numbers of that hardware may be entered manually or by scanning or imaging the part number. In this regard, these operators may be able to update the vehicle parameters (i.e. by changing part numbers, etc.), for instance, using work station 440, which in this example, may be located in service station 680. Similarly, the server computing devices 410 may generate or receive and store the work orders described above.

The server computing devices 410 may determine a vehicle operation mode for each vehicle of the vehicle fleet using the most up to date information in the storage system 450. For instance, referring to the hierarchical operations levels example, the server computing devices 410 may use the vehicle parameters for a given vehicle, such as vehicle 100, to determine whether the vehicle meets the hardware, software, basic info, hour and/or mileage and any other requirements of each operations level starting with the lowest operations level. For instance, the server computing devices 410 may first determine whether the vehicle parameters for vehicle 100 meet the requirements for Level 0, and if so, determine whether the vehicle parameters for vehicle 100 meet the requirements for Level 1, and so on. The server computing devices 410 may also consider any open work orders for the vehicle 100. The server computing devices 410 may identify a highest operations level for which the vehicle parameters of vehicle 100 meet the requirements as the operations mode for the vehicle. At this point, the server computing devices 410 may stop, or alternatively, the system may continue processing the requirements of higher operations levels in order to determine which requirements the vehicle 100 needs to meet in order to reach the higher operations levels.

As such, the server computing devices 410 may provide an operator with a report identifying which, if any, requirements are not met for each hierarchical operations level. A report may be generated and stored, for instance in storage system 450, with an identifier for each vehicle of the fleet, which may allow an operator to retrieve a report for a given vehicle, for instance by using the identifier for the given vehicle. This report may assist the operator in determining how to increase the hierarchical operations level of the given vehicle, for instance by changing out a piece of hardware, performing some testing requirement, updating software, etc. These reports may also allow operators to prioritize work on different vehicles for instance those at the lowest levels or those with the fewest needed changes to increase to a higher operations levels. Thus, the overall efficiency in the allocation of resources can be increased.

Returning to the tag example, the server computing devices 410 may determine a vehicle operation mode for a given vehicle, such as vehicle 100, by first generating an initial set of tags for the given vehicle. Thereafter, those tags are filtered in order to determine a final set of tags for vehicle 100. For instance, the initial set of tags may be generated by first identifying all tags for which the given vehicle meets the hardware or vehicle part requirements. This initial set of tags may then be filtered to remove any tags for which the vehicle 100 does not meet software requirements, hour and/or mileage requirements, instruction sticker requirements, basic information requirements, and any blocking work orders (in this or any order). Alternatively, rather than starting with hardware or vehicle part requirements to generate the initial set of tags, one could start with a different type of requirements, such as software requirements, and then filter the set using the other requirements (i.e. hardware or vehicle part requirements, hour and/or mileage requirements, instruction sticker requirements, basic information requirements, and any blocking work orders).

The resulting filtered set of tags may be used to determine an operation mode for the vehicle. For instance, the combination of the final set of tags for vehicle 100A may be compared to the predetermined combinations in order to identify an operations mode for the vehicle or may together define the operation mode for the vehicle. As with the hierarchical operations levels examples, the server computing devices 410 may also generate reports. Again, these reports may allow an operator to identify the operation levels of specific vehicles, whether those vehicles meet certain requires for certain tags, as well as what mitigation steps are needed to obtain different tags.

These operation mode determinations, hierarchical operation level or tag-based, may be made periodically, for instance, every minute or more or less, or each time a vehicle provides an update to the system. Alternatively, these determinations may be made or revised for a vehicle each time there is a change in the vehicle parameters for that vehicle, each time a new work order is opened, or each time there is a change to the different operations modes, such as the tag combinations, new tags, new hierarchical operations levels, new tag or hierarchical operation level requirements, etc.

Each time an operation mode determination is made for a given vehicle, using the tags examples and/or hierarchical operations levels examples, the server computing devices 410 may communicate the determined operations level to the given vehicle. For instance, the server computing devices 410 may transmit or otherwise send a notification to vehicle 100 identifying the determined operations level as the new operations mode for the vehicle over network 460.

In response, the computing devices 110 may continue to operate vehicle 100 at the current operations mode if the same as the new operations mode, or may begin to operate at a different operations mode if the new operations mode is different from the current operations mode. Of course, in certain situations, such as at Levels 6 or above (when referring to the hierarchical operations levels), it may be better for the vehicle to continue a current task before beginning to operate at a lower level where the vehicle is no longer able to operate autonomously on public roads, especially where the vehicle's current task involves transporting passengers or there is no driver to take control of the vehicle. In some instances, the vehicle may display a warning, error message, or other notification to any occupants of the vehicle indicating a change (to increase or decrease) an operations mode and/or a corresponding change in behavior.

In addition to making changes at the vehicle, the behavior of the system 400 may be changed in response to a change in an operations mode of a vehicle. For instance, a dispatching server (which may include one or more of server computing devices 410) may not schedule a vehicle at Level 4 or below for trips in an autonomous driving mode or a vehicle at Level 6 or below for a trip with a passenger. Similarly, the dispatching server may not schedule a vehicle without Tag ID T05 to pick up passengers in the rain or may not schedule a vehicle without Tag ID T03 to take a trip if a test driver is not available or currently indicated to be in the vehicle.

Figure 8:
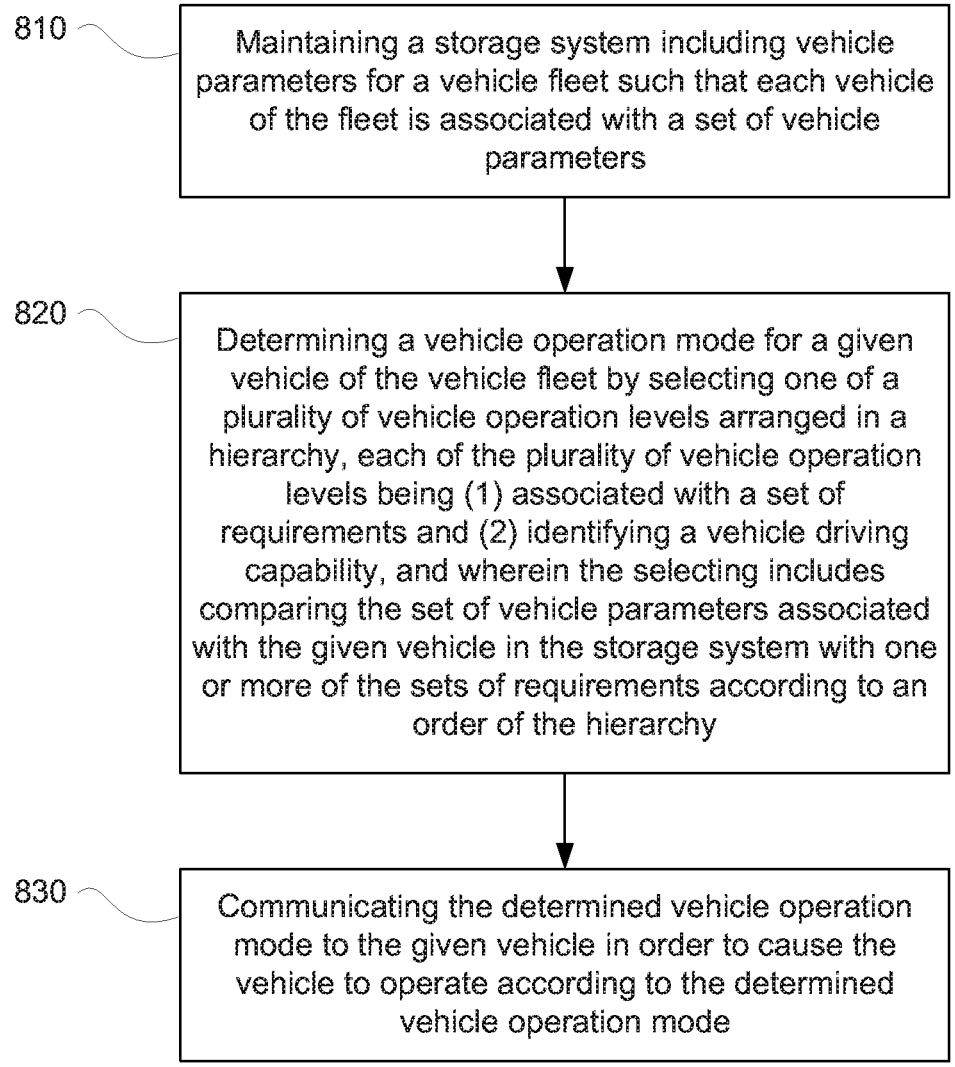
FIG. 8 is a flow diagram in accordance with aspects of the disclosure.

FIG. 8 includes an example flow diagram 800 of some of the examples for determining a vehicle operation mode for a vehicle of a fleet of vehicles. The features of flow diagram 800 may be performed, for instance, by one or more processors, such as the processor of server computing devices 410. In the example, a storage system including vehicle parameters for a vehicle fleet is maintained at block 810. Each vehicle of the fleet is associated with a set of vehicle parameters. At block 820, a vehicle operation mode is determined for a given vehicle of the vehicle fleet by selecting one of a plurality of vehicle operation levels arranged in a hierarchy. Each of the plurality of vehicle operation levels is associated with a set of requirements and identifies a vehicle driving capability. In this regard, the selecting includes comparing the set of vehicle parameters associated with the given vehicle in the storage system with one or more of the sets of requirements according to an order of the hierarchy. At block 830, the determined vehicle operation mode is communicated to the given vehicle in order to cause the vehicle to operate according to the determined vehicle operation mode.

Figure 9:
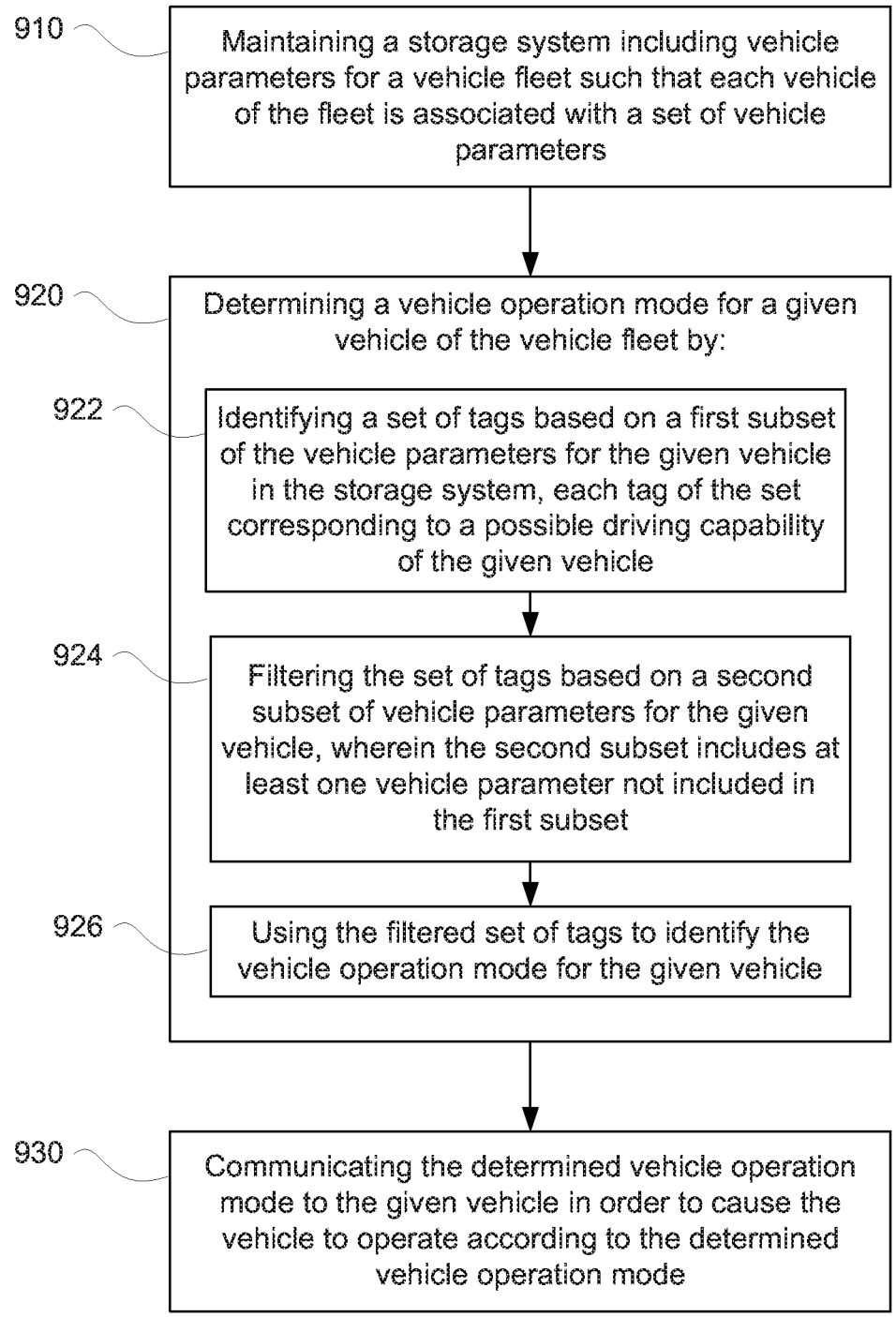
FIG. 9 is a flow diagram in accordance with aspects of the disclosure.

FIG. 9 includes another example flow diagram 900 of some of the examples for determining a vehicle operation mode for a vehicle of a fleet of vehicles. The features of flow diagram 900 may be performed, for instance, by one or more processors, such as the processor of server computing devices 410. In the example, a storage system including vehicle parameters for a vehicle fleet is maintained at block 910. Each vehicle of the fleet is associated with a set of vehicle parameters. At block 920, a vehicle operation mode is determined for a given vehicle of the vehicle fleet by: identifying a set of tags based on a first subset of the vehicle parameters for the given vehicle in the storage system at block 922, where each tag of the set corresponding to a possible driving capability of the given vehicle; filtering the set of tags based on a second subset of vehicle parameters for the given vehicle at block 924, where the second subset includes at least one vehicle parameter not included in the first subset, and using the filtered set of tags to identify the vehicle operation mode for the given vehicle at block 926. At block 930, the determined vehicle operation mode is communicated to the given vehicle in order to cause the vehicle to operate according to the determined vehicle operation mode.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
maintaining a storage system including vehicle parameters for a vehicle fleet such that each vehicle of the fleet is associated with a set of vehicle parameters;
determining a vehicle operation mode for a given vehicle of the vehicle fleet by selecting one of a plurality of vehicle operation levels arranged in a hierarchy, each of the plurality of vehicle operation levels being associated with a respective set of requirements,
wherein the selecting includes selecting a highest vehicle operation level in the hierarchy for which the set of vehicle parameters meets the respective set of requirements associated with the highest vehicle operation level by comparing the set of vehicle parameters associated with the given vehicle in the storage system with the respective sets of requirements associated with respective ones of the plurality of vehicle operation levels according to an order of the hierarchy; and
communicating the determined vehicle operation mode to the given vehicle in order to cause the vehicle to operate according to the determined vehicle operation mode.

2. The method of claim 1, wherein the storage system comprises a plurality of values for each vehicle in the vehicle fleet, the values including part numbers for a set of vehicle parts installed on the vehicle.

3. The method of claim 1, wherein the storage system comprises a plurality of values for each vehicle in the vehicle fleet, the values including calibration information for vehicle sensors.

4. The method of claim 1, wherein the storage system comprises a plurality of values for each vehicle in the vehicle fleet, the values including software versions being run on each vehicle.

5. The method of claim 1, further comprising receiving data from a respective vehicle of the fleet and responsively updating the storage system.

6. The method of claim 5, further comprising, in response to receiving data from the respective vehicle, determining a revised vehicle operation mode and communicating the revised vehicle operation mode to the respective vehicle.

7. The method of claim 1, further comprising:
receiving revised vehicle operation level criteria;
responsively determining a revised vehicle operation mode for the vehicle using the revised vehicle operation level criteria; and
communicating the revised vehicle operation mode to the vehicle in order to cause the vehicle to operate according to the revised vehicle operation mode.

8. The method of claim 1, wherein the plurality of vehicle operation levels includes a level including an autonomous driving mode.

9. The method of claim 8, wherein the plurality of vehicle operation levels includes a level including a manual driving mode.

10. The method of claim 1, wherein determining and communicating the vehicle operation mode are performed periodically for the given vehicle.

11. A method comprising:
maintaining a storage system including vehicle parameters for a vehicle fleet such that each vehicle of the fleet is associated with a set of vehicle parameters;

determining a vehicle operation mode for a given vehicle of the vehicle fleet by:
- identifying a combination of predetermined tags associated with an associated set of requirements;
- identifying a set of tags based on a first subset of the vehicle parameters for the given vehicle in the storage system, each tag of the set corresponding to a possible driving capability of the given vehicle,
- filtering the set of tags based on a second subset of vehicle parameters for the given vehicle, wherein the second subset includes at least one vehicle parameter not included in the first subset, and
- comparing the filtered set of tags to the combination of predetermined tags to identify the vehicle operation mode for the given vehicle; and communicating the determined vehicle operation mode to the given vehicle in order to cause the vehicle to operate according to the determined vehicle operation mode.

12. The method of claim 11, wherein the set of tags includes a tag identifying that the given vehicle is capable of driving in an autonomous driving mode.

13. The method of claim 11, wherein the set of tags includes a tag identifying that the given vehicle is capable of driving in an autonomous driving mode without a test driver.

14. The method of claim 11, wherein the set of tags includes a tag identifying that the given vehicle is capable of driving in an autonomous driving mode and transporting passengers.

15. The method of claim 11, wherein the set of tags includes a tag identifying that the given vehicle is capable of driving in a given type of weather condition.

16. The method of claim 15, wherein the given type of weather condition includes rain.

17. The method of claim 11, wherein the set of tags includes a tag identifying that the given vehicle is capable of driving in a given type of road surface condition.

18. The method of claim 17, wherein the given type of road surface condition includes a degree of slipperiness of a roadway.

19. The method of claim 11, wherein the set of tags includes a tag identifying that the given vehicle is capable of driving in external environments having a predetermined temperature.

20. The method of claim 11, wherein filtering the set of tags is further based on whether the storage system includes a work order for the given vehicle identifying an operation mode requirement for the given vehicle.

* * * * *